T. B. YEAMAN.
RESILIENT WHEEL TIRE.
APPLICATION FILED OCT. 1, 1913.
1,093,902.
Patented Apr. 21, 1914.
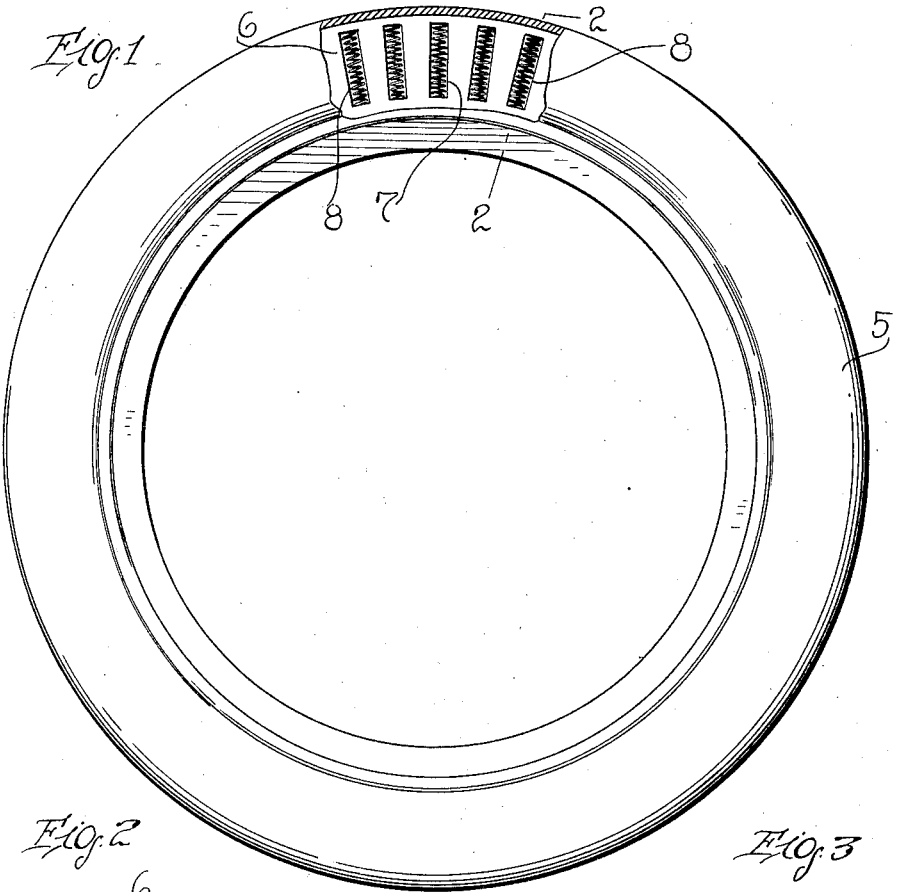
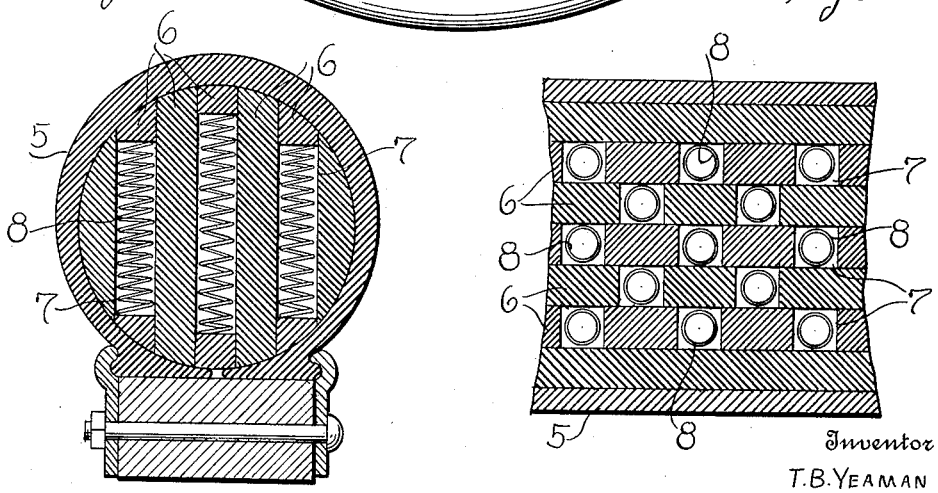
Witnesses
Robert M. Sutphen.
V. J. Dowrick.
Inventor
T. B. YEAMAN
By Watson E. Coleman
Attorney

UNITED STATES PATENT OFFICE.

THOMAS BATES YEAMAN, OF NASHVILLE, TENNESSEE.

RESILIENT WHEEL-TIRE.

1,093,902. Specification of Letters Patent. Patented Apr. 21, 1914.

Application filed October 1, 1913. Serial No. 792,862.

*To all whom it may concern:*

Be it known that I, THOMAS B. YEAMAN, citizen of the United States, residing at Nashville, in the county of Davidson and State of Tennessee, have invented certain new and useful Improvements in Resilient Wheel-Tires, of which the following is a specification, reference being had to the accompanying drawings.

This invention relates to an improved resilient tire for wheels and has for its primary object to provide means embodied in the tire structure whereby an efficient and reliable substitute is produced for the ordinary pneumatic tube now in common use.

My invention has for another and more particular object the provision of a wheel tire embodying the usual outer casing, and a core entirely filling said casing and made up of a plurality of laminated layers of rubber or other yieldable material, each of said rubber layers being provided with means for increasing the resiliency of the tire as a whole.

My invention has for a further object to provide a wheel tire which is of simple construction, highly resilient as well as durable in practical use and will not be injuriously affected by nails or other sharp objects piercing the outer casing.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing, in which—

Figure 1 is a side elevation of a wheel provided with my improved tire, the same being partly shown in section. Fig. 2 is an enlarged section taken on the line 2—2 of Fig. 1. Fig. 3 is a detail fragmentary horizontal section.

Referring in detail to the drawings, 5 designates the usual outer casing of the wheel tire which may consist of a number of rubber and fabric layers adhesively secured together, or may be of any other ordinary or approved construction. This casing is open upon one side and is provided at its edges with means whereby the same may be readily arranged upon the wheel rim and retained in position thereon.

The body of the tire consists of a resilient core made up of a plurality of laminations of rubber indicated at 6. I preferably employ five such rubber layers which entirely fill the casing 5. Each of the layers 6 is provided at intervals with slots 7, and it will be noted from reference to Fig. 3 that said slots when the rubber laminations are disposed within the outer casing, are alternately arranged, or in other words, the slots in adjacent rubber layers are out of registering relation transversely of the tire. In each of the slots 7 an expansion coil spring 8 is arranged said springs normally acting to yieldingly retain the rubber laminations in their normal condition and distend the tire casing 5.

From the above description it will be seen, that when the wheel passes over an obstruction, all shock or jar will be immediately absorbed by the tire and will not be imparted to the wheel axle or the body of the vehicle. The expense incident to frequent repair of the steering mechanism and other parts of the vehicle occasioned by such violent shocks is thus obviated. By providing a solid resilient core for the tire, having a plurality of springs embodied therein, the usefulness of the tire is in no wise affected by nails, glass or other sharp objects penetrating the outer casing as is the case with the ordinary pneumatic tire. It will further be obvious that my improved tire may be produced at very small manufacturing cost and is highly efficient and serviceable in practical use.

While I have shown and described the preferred construction and arrangement of the several elements constituting my invention, it will be understood that the same is susceptible of various modifications therein without departing from the spirit or sacrificing any of the advantages thereof except as defined in the appended claim.

Having thus described the invention, what is claimed is:

A wheel tire including an outer casing, a core in said casing embodying a plurality of annular rubber laminations, frictionally engaging at their edges with the wall of the casing, and each provided with a series of radially extending slots, springs arranged in said slots, the slots in each lamination being disposed in staggered relation to the slots in adjacent laminations transversely of the tire, said slots being closed by the laminations upon each side thereof whereby the transverse movement of the springs with respect to the laminæ is prevented.

In testimony whereof I hereunto affix my signature in the presence of two witnesses.

THOMAS BATES YEAMAN.

Witnesses:
S. J. ASEE,
Mrs. J. E. SMITH.

Copies of this patent may be obtained for five cents each, by addressing the "Commissioner of Patents, Washington, D. C."